United States Patent Office 3,551,162
Patented Dec. 29, 1970

3,551,162
NOVEL RUMINANT FEED SUPPLEMENT
Richard Lapham Gilbert, Jr., Princeton, N.J., assignor to American Cyanamid Company, Stamford, Conn., a corporation of Maine
No Drawing. Filed Apr. 4, 1967, Ser. No. 628,296
Int. Cl. A23k 1/22
U.S. Cl. 99—2      7 Claims

ABSTRACT OF THE DISCLOSURE

The present invention relates to a novel nitrogen-phosphorus ruminant feed supplement, and to a method for the preparation thereof. More particularly, it relates to a novel nitrogen-phosphorus feed supplement of enhanced palatability to ruminant animals. Still more particularly, the invention is concerned with a ruminant feed supplement, urea-ammonium phosphate, characterized by enhanced palatability to ruminant animals having (a) an ammonia to phosphoric acid mole ratio of from 1:1 to 1.4:1, respectively; (b) an ammonia nitrogen to urea nitrogen ratio not more than 2 to 8.75, respectively; and (c) a ratio of total nitrogen to phosphorus not less than about 3 and not more than about 10 to 1, respectively.

BACKGROUND OF THE INVENTION

The utilization of urea and related compounds in ruminant feeds as a source of non-protein nitrogen was reported more than a decade ago. Since that time urea has been used in such feeds in amounts which are sufficient to furnish as much as 8.75% protein equivalent. While this practice has been widely accepted, investigations have recently shown that feed supplements containing urea are frequently unpalatable to animals. Such unpalatability appears to be largely due to the release of ammonia either in the feed bin or in the mouth of the feeding animal. Additionally, urea alone does not furnish the phosphorus required for normal growth. Hence, phosphorus-containing materials, such as sodium phosphate, phosphoric acid, diammonium phosphate, dicalcium phosphate and monocalcium phosphate, have also been incorporated along with urea into animal feeds. Unfortunately, many such compositions create caking and handling problems; others do not furnish as much non-protein nitrogen as desirable. Thus, none of these compositions has been found to be wholly satisfactory, since they appear to lack animal palate acceptance. If a composition having the required high nitrogen to phosphorus content which is accepted by the ruminant animal could be provided, such a composition would meet a long-felt need in the art.

It is, therefore, a principal object of the invention to provide a nitrogen-phosphorus animal feed supplement which overcomes the disadvantages of the prior practice. It is a further object to provide a high nitrogen-phosphorus supplement composition which is accepted by a ruminant animal. Other objects and advantages will become apparent from a consideration of the ensuing description.

To this end, there is provided feed supplements prepared in a straightforward manner by any of several methods. These involve the use of urea, ammonia and phosphoric acid present in sufficient amounts and form to provide a supplement of enhanced palatability. There is maintained (a) an ammonia to phosphoric acid mole ratio from about 1:1 to 1.4:1, respectively, and, preferably, 1.3:1; (b) an ammonia nitrogen to urea nitrogen ratio not more than 2 to 8.75, respectively; and (c) a ratio of total nitrogen to phosphorus between about 3 and 10 to 1, respectively, and, preferably, about 4.5 to 1.

According to the invention, the novel compositions can be prepared by a variety of procedures. These include, for instance, the preparation of urea-ammonium phosphates by: (1) mixing ammonium phosphate slurry or paste with a concentrated urea solution; (2) mixing dry ammonium phosphate with concentrated urea solution (about 95% urea); or (3) dry blending finely-ground urea and ammonia phosphate.

Although none of the aforementioned methods for the preparation of such compositions is critical, the nitrogen to phosphorus ratio in resultant product is of critical import. In general, the preparation of the ammonium phosphate having a ratio of $NH_3/H_3PO_4$ of 1.3 may be accomplished either by the ammoniation of any phosphoric acid having a phosphorus to fluorine ratio greater than 100 to 1, such as by defluorinated wet-process phosphoric acid, or by the addition of such phosphoric acid to a slurry or dry solid diammonium phosphate.

As a good practice, the compositions of the invention are added to a normal ruminant feed ration usually in an amount calculated to supply up to the total daily requirement of phosphorus. Although the reasons for the enhanced palatability of these compositions is not entirely understood, it is believed that the control of the acidity of the nitrogen-phosphorus feed supplement prevents the release of ammonia both in the animal feed bucket and the mouth of the feeding animal and, as such, the composition is readily consumed by the animal.

For a clearer understanding of the invention, the following examples are presented for purposes of illustration. These are not to be taken as limitative. Unless otherwise stated, the parts are by weight.

EXAMPLE 1

In a suitable reaction vessel equipped with stirrer, there are admixed 522.9 parts of wet-process phosphoric acid, analyzing as 54.3% $P_2O_5$ having a $P/F$ ratio greater than 100/1, and 88.4 parts of anhydrous ammonia in the following manner:

A heel of 70 parts of diluted ammonia water containing ten parts of ammonia is suitably added to the reaction vessel and the stirrer started. There are then added thereto 51.9 parts (approximately 30 parts by volume) of the defluorinated wet-process phosphoric acid at a rate of about three parts per minute until the $NH_3:H_3PO_4$ mole ratio is about 1.5:1. An increment of two parts of ammonia is added at a rate of about one part every four minutes and until a ratio of 1.8:1 is attained. This is followed by the addition of an increment of ten and four-tenths parts (approximately 6 parts by volume) of the acid. A ratio equal to 1.5:1 is attained. The alternate addition of the same weight increments of both ammonia (2 parts) and wet-process phosphoric acid (10.4 parts) is continued until all of the ammonia has been added. After about one-half of the ammonia has been added, the rate of ammonia addition is increased to one part every three minutes until all the ammonia has been added. At this point, the remiander of the acid is added. Resultant slurry is cooled, stirred down to room temperature while stirring to recover ammonium phosphate as a dark-brown semi-solid mass. Upon analysis, the latter product contains 13.2% $NH_3$, 59.2% $H_3PO_4$ and 23.2% water, the mole ratio of $NH_3:H_3PO_4$ being equal to 1.29.

EXAMPLE 2

Diammonium phosphate prills (500 parts) are ground in a hammer-mill and the coarse powder is slurried with the 227 parts of defluorinated wet-process phosphoric acid (54% $P_2O_5$) and 225 parts of water in a glass beaker. The mixture is next heated to 90° C., with stirring, to dissolve the ammonium phosphate. The hot mixture is permitted to cool to room temperature with continuous stirring. Resultant thick slurry is spread on a porcelain plate and water is then removed therefrom by placing the latter plate in an oven at 70° C. until the product becomes dry and brittle. The plate is removed and cooled to room temperature. Finally, the dried ammonium phosphate product is ground in a hammer-mill to a coarse powder. Upon analysis the latter is found to contain 12.4% $N_2$, 51.8% $P_2O_5$ equivalent to 15.1% $NH_3$, 71.5% $H_3PO_4$, the mole ratio of $NH_3:H_3PO_4$ being equal to 1.15.

EXAMPLE 3

In a suitable vessel there are dissolved 68 parts of urea in 2.8 parts of water at 127° C. To the latter are added 45.6 parts of the semi-soft ammonium phosphate product as prepared in Example 1 above to the hot urea solution and mixed for one minute with a paddle stirrer to obtain a thin uniform slurry. Resultant hot thin slurry is then cast on a porcelain plate and allowed to cool to room temperature to a hard flat slab. The slab is broken into small segments of from about one-half to one inch and the urea-ammonium phosphate product dried at 40° C. The latter upon analysis contains 30.4% urea nitrogen, 4.8% ammonia nitrogen and 8.6% phosphorus, the ratio of N:P being 4.2:1 and the ratio of ammonia nitrogen to urea nitrogen being 1.38 to 8.75.

EXAMPLE 4

Ten parts of water are added to a three-neck flask fitted with a paddle stirrer. The stirrer is started and the water heated. 68 parts of urea are added portionwise so as to maintain a thin urea slurry or a solution. As the temperature rose to 110° C., complete solution of the urea occurred. Heating is terminated and 37.2 parts of the milled ammonium phosphte product as prepared in Example 2 are added with continued stirring until a homogeneous mixture results. The temperature of the slurry is lowered to about 80° C. Little evolution of gas is noted. The resultant melt is cast on a porcelain plate, allowed to cool to room temperature and removed from the plate. The hard, flat slab is broken into segments and dried overnight at 65° C. Resultant urea-ammonium phosphate product is ground in a hammer-mill. Upon analysis, it contains 29.6% urea nitrogen, 3.9% ammonia nitrogen and 8.0% phosphorus, the ratio of $N:P$ being 4.2:1 and the ratio of ammonia nitrogen to urea nitrogen being 1.15 to 8.75.

EXAMPLE 5

37.2 parts of ground ammonium phosphate as prepared in Example 1 above are blended with 68.0 parts of urea and then dried at 65° C. for three hours. The urea-ammonium phosphate product is found to possess the same analysis presented in Example 4 above.

EXAMPLE 6

To a suitable reaction vessel containing a heel of 250 parts of water and 172.4 parts of aqua ammonia are added 260 parts of 54.3% $P_2O_5$ defluorinated acid. Resultant mixture is sufficient to form a heel to which the phosphoric acid and ammonia are added continuously and held at 80° C.–90° C. Relative rates of addition are 20 parts of ammonia for each 60 parts (by volume) of 54.3% $P_2O_5$ acid until all of the required ammonia (i.e., 1,500 parts) have been added. Total acid added at this time is about 7,785 parts; the remainder, 1,090 parts, to make a total of 8,875 parts, are added as one final increment.

The ratio of $NH_3/H_3PO_4$ is then determined by analysis, and the composition is adjusted by addition of more ammonia. (Some ammonia is presumably lost in the off-gas from the reactor because of incomplete absorption.) The thick slurry, at a temperature of 90° C., is poured into polyethylene-lined trays and tray-dried at 65° C. The cake in the tray is broken up and turned at intervals to assist in drying. Ammonium phosphate as a dry product analyzes as 16.6% $NH_3$, 53.7% $P_2O_5$ having an $NH_3:H_3PO_4$ ratio equal to 1.29:1.

35.5 parts of 60 mesh ammonium phosphate are admixed with 66.2 parts of ground urea and 0.5 part of calcium stearate to maintain the resultant urea-ammonium phosphate as a free-flowing product. Mixing is accomplished in a double cone blender. The product is stored in fiber drums and analyzes as containing a $N:P$ ratio equal to 4.2 and an ammonia nitrogen to urea nitrogen ratio equal to 1.4:8.75.

EXAMPLE 7

This example is presented to determine whether cattle would readily accept and, ultimately, consume a ration containing urea-ammonium phosphate (UAP) as prepared in Example 6 above over an eighteen day period.

Four Hereford steers which weigh approximately 650 pounds each are housed in individual pens. Each day the steers are offered a choice between a control ration containing urea and dicalcium phosphate and the test ration containing UAP and limestone. The rations are fed in a wooden feeder that is divided into two sections. Periodically, the rations are switched from one side to the other so that the animals would not become accustomed to finding a particular ration on a certain side of the feeder.

The rations are identical except that the control ration contains Supplement A and the test ration contains Supplement B as shown in Table I below.

TABLE I.—COMPOSITION OF RATIONS USED IN TEST

| Ingredient | Complete ration as fed, percent | |
|---|---|---|
| | Control | Test |
| Ground corn cobs | 41.6 | 41.6 |
| Ground yellow corn | 31.7 | 31.7 |
| Dehydrated alfalfa meal (17%) | 10.0 | 10.0 |
| Soybean oil meal (44%) | 5.0 | 5.0 |
| Cane molasses | 5.0 | 5.0 |
| Supplement | 6.7(A) | 6.7(B) |
| Total | 100.0 | 100.0 |

| | Composition of supplement, percent | |
|---|---|---|
| | A | B |
| Dry molasses | 14.0 | 14.0 |
| Dehydrated alfalfa meal (17%) | 50.5 | 50.5 |
| Urea (42% N) | 19.6 | 0.0 |
| Dicalcium phosphate (26% Ca, 18.5 P) | 10.4 | 0.0 |
| Urea-ammonium phosphate (34.9% N, 8.2% P) | 0.0 | 22.9 |
| Limestone (38% Ca) | 0.0 | 7.1 |
| Iodized salt | 3.5 | 3.5 |
| Vitamin and mineral premix [a] | 2.0 | 2.0 |

[a] Premix contributes 20,000 I.U. vitamin A, 1,000 mg. zinc and 2 mg. cobalt per pound of supplement.

Supplement A contains urea plus dicalcium phosphate, whereas Supplement B contains urea-ammonium phosphate plus limestone. Supplements A and B contain equivalent amounts of nitrogen, phosphorus and calcium. Both the control and test rations are completely pelleted into three-eighth inch pellets.

As above stated, the steers are offered a choice between the two rations for an 18-day period. The steers are fed ad libitum, and each day feed refusals are weighed and discarded so that the animals always have a choice between two fresh feeds. All animals have access to water and a trace-mineralized salt block during the test.

The results are summarized in Table II below. It is clear that the ration containing UAP is readily accepted by these animals. The average for the 18-day feeding period indicates that all four steers preferred the ration containing UAP over the control ration.

TABLE II.—DAILY CONSUMPTION (lb.) OF CONTROL AND UREA-AMMONIUM PHOSPHATE (UAP) RATIONS IN TEST 1

| Day | Steer No. 5 Control | Steer No. 5 UAP | Steer No. 6 Control | Steer No. 6 UAP | Steer No. 7 Control | Steer No. 7 UAP | Steer No. 8 Control | Steer No. 8 UAP | Average 5-8 Control | Average 5-8 UAP |
|---|---|---|---|---|---|---|---|---|---|---|
| 1st | 0.0 | 19.5 | 7.0 | 9.6 | 0.0 | 18.8 | 15.4 | 1.5 | 5.6 | 12.4 |
| 2nd | 0.0 | 15.4 | 0.0 | 15.5 | 2.0 | 16.0 | 16.0 | 0.5 | 4.5 | 11.9 |
| 3rd | 1.9 | 15.9 | 0.8 | 15.8 | 1.0 | 11.7 | 15.2 | 0.0 | 4.7 | 10.9 |
| 4th | 0.0 | 16.4 | 5.2 | 11.0 | 4.4 | 15.4 | 13.1 | 3.2 | 5.7 | 11.2 |
| 5th | 0.3 | 17.5 | 1.3 | 16.7 | 14.2 | 4.8 | 3.9 | 14.2 | 4.9 | 13.7 |
| 6th | 0.0 | 15.9 | 0.2 | 14.2 | 14.2 | 0.8 | 0.6 | 15.0 | 3.8 | 11.1 |
| 7th | 0.0 | 14.2 | 2.4 | 11.4 | 15.8 | 1.6 | 6.0 | 12.5 | 6.1 | 9.6 |
| 8th | 0.0 | 15.9 | 7.5 | 9.6 | 6.5 | 13.9 | 15.8 | 0.8 | 7.5 | 10.5 |
| 9th | 1.9 | 15.3 | 4.9 | 13.8 | 1.4 | 16.7 | 18.5 | 0.0 | 6.7 | 11.9 |
| 10th | 0.0 | 16.5 | 3.0 | 16.7 | 9.9 | 7.8 | 0.0 | 18.5 | 3.2 | 14.1 |
| 11th | 0.0 | 16.8 | 4.9 | 12.3 | 4.8 | 12.4 | 1.0 | 18.8 | 2.7 | 15.5 |
| 12th | 0.1 | 15.9 | 3.9 | 16.2 | 1.7 | 15.6 | 2.8 | 17.1 | 2.1 | 16.9 |
| 13th | 5.2 | 13.1 | 9.4 | 9.3 | 10.5 | 9.8 | 10.5 | 10.4 | 8.9 | 10.5 |
| 14th | 0.0 | 16.0 | 1.0 | 14.8 | 0.0 | 16.7 | 3.2 | 16.8 | 1.1 | 16.1 |
| 15th | 0.8 | 17.3 | 2.3 | 16.9 | 0.7 | 16.5 | 0.0 | 19.5 | 1.0 | 17.5 |
| 16th | 1.8 | 17.9 | 2.9 | 15.3 | 1.5 | 7.3 | 1.0 | 17.5 | 1.8 | 14.3 |
| 17th | 0.0 | 16.1 | 1.5 | 17.5 | 0.5 | 15.0 | 0.0 | 19.5 | 0.5 | 17.0 |
| 18th | 4.5 | 20.0 | 2.8 | 15.8 | 3.0 | 15.0 | 3.5 | 15.5 | 3.5 | 16.6 |
| Avg | 0.9 | 16.4 | 3.4 | 14.0 | 5.1 | 12.0 | 7.0 | 11.2 | 4.1 | 13.4 |

EXAMPLE 8

Preference of urea-ammonium phosphate rations by cattle

In this example, a second test is conducted for 18-days to determine whether cattle prefer rations containing UAP plus limestone over rations containing urea plus dicalcium phosphate as observed in Example 7.

Four differernt Hereford steers (not the same steers used in Test No. 1) that weigh approximately 750 pounds each are employed. The test procedure in this example is the same as that described for the first test of Example 7 above.

The rations which are employed in this test are set forth in Table III below.

The amount of supplement used in the total ration is lower in the present test. The objective in both tests is to provide approximately one pound of supplement per animal per day. In Test No. 1 of Example 7 above, it is assumed that the animals would eat 15 pounds of feed per day and this would supply the animals one pound of supplement ($15 \times 6.7\% = 1.0$). However, in Test No. 2, it is assumed that the animals would eat 20 pounds of feed per day and for this reason, the amount of supplement in the total ration has been lowered ($20 \times 5.0 = 1.0$).

The test results of this example are shown in Table IV. It is clear that all the animals tested distinctly prefer the ration of the present invention containing UAP plus limestone over the control ration containing urea plus dicalcium phosphate.

TABLE IV.—DAILY CONSUMPTION (lb.) OF CONTROL AND UREA-AMMONIUM PHOSPHATE (UAP) RATIONS IN TEST NO. 2

| Day | Steer No. 1 Control | Steer No. 1 UAP | Steer No. 2 Control | Steer No. 2 UAP | Steer No. 3 Control | Steer No. 3 UAP | Steer No. 4 Control | Steer No. 4 UAP | Average 1-4 Control | Average 1-4 UAP |
|---|---|---|---|---|---|---|---|---|---|---|
| 1st | 0.0 | 26.9 | 0.6 | 19.0 | 3.5 | 20.0 | 2.8 | 20.0 | 1.7 | 21.5 |
| 2nd | 0.0 | 21.2 | 0.0 | 15.0 | 4.7 | 7.5 | 0.0 | 13.1 | 1.2 | 14.2 |
| 3rd | 0.0 | 19.4 | 0.0 | 9.2 | 0.0 | 19.0 | 0.0 | 19.2 | 0.0 | 16.7 |
| 4th | 0.0 | 20.0 | 0.0 | 15.8 | 0.0 | 20.7 | 0.0 | 13.7 | 0.0 | 17.6 |
| 5th | 0.0 | 19.0 | 0.0 | 12.0 | 0.0 | 19.6 | 0.0 | 18.2 | 0.0 | 17.2 |
| 6th | 0.0 | 19.2 | 0.0 | 15.6 | 0.5 | 18.8 | 0.0 | 14.8 | 0.1 | 17.1 |
| 7th | 0.0 | 21.8 | 0.0 | 14.8 | 0.0 | 18.8 | 0.0 | 16.1 | 0.0 | 17.9 |
| 8th | 0.0 | 18.5 | 0.0 | 18.0 | 0.0 | 20.0 | 0.0 | 15.0 | 0.0 | 17.9 |
| 9th | 0.0 | 22.9 | 0.0 | 17.0 | 0.0 | 14.7 | 0.0 | 10.6 | 0.0 | 16.3 |
| 10th | 0.0 | 19.3 | 1.0 | 18.4 | 0.0 | 22.0 | 1.0 | 17.0 | 0.5 | 19.4 |
| 11th | 0.0 | 17.5 | 0.0 | 13.5 | 0.0 | 16.5 | 0.0 | 14.0 | 0.0 | 15.4 |
| 12th | 0.0 | 25.0 | 0.0 | 16.5 | 0.0 | 19.5 | 0.0 | 17.0 | 0.0 | 19.5 |
| 13th | 0.0 | 22.5 | 0.0 | 18.0 | 0.0 | 19.5 | 0.0 | 13.5 | 0.0 | 18.4 |
| 14th | 0.0 | 18.5 | 5.0 | 12.5 | 0.0 | 16.0 | 0.0 | 15.0 | 1.3 | 15.5 |
| 15th | 0.0 | 4.0 | 0.0 | 6.5 | 0.0 | 11.0 | 0.0 | 5.5 | 0.0 | 6.8 |
| 16th | 1.0 | 23.6 | 1.0 | 4.5 | 1.5 | 18.1 | 7.0 | 8.2 | 2.6 | 13.6 |
| 17th | 0.0 | 17.8 | 0.0 | 8.2 | 0.0 | 20.0 | 0.0 | 17.5 | 0.0 | 15.9 |
| 18th | 0.0 | 19.5 | 0.0 | 12.0 | 0.0 | 17.5 | 0.0 | 13.5 | 0.0 | 15.6 |
| Avg | 0.1 | 19.8 | 0.4 | 13.7 | 0.6 | 17.7 | 0.6 | 14.6 | 0.4 | 16.5 |

TABLE III.—COMPOSITION OF RATIONS EMPLOYED IN TEST NO. 2

| Ingredient | Complete ration as fed, percent Control | Complete ration as fed, percent Test |
|---|---|---|
| Ground corn cobs | 41.6 | 41.6 |
| Ground yellow corn | 33.4 | 33.4 |
| Dehydrated alfalfa meal (17%) | 10.0 | 10.0 |
| Soybean oil meal (44%) | 5.0 | 5.0 |
| Cane molasses | 5.0 | 5.0 |
| Supplement | 5.0(A) | 5.0(B) |
| Total | 100.0 | 100.0 |

| | Composition of supplement, percent A | Composition of supplement, percent B |
|---|---|---|
| Dry molasses | 14.0 | 14.0 |
| Dehydrated alfalfa meal (20%) | 49.0 | 49.0 |
| Urea (42% N) | 19.6 | 0.0 |
| Dicalcium ohosphate (26% Ca, 18.5% P) | 10.4 | 0.0 |
| Urea-ammonium phosphate (UAP) (34.9% N, 8.2% P) | 0.0 | 23.3 |
| Calcium carbonate (40% Ca) | 0.0 | 6.7 |
| Salt | 5.0 | 5.0 |
| Vitamin and mineral premix[a] | 2.0 | 2.0 |

[a] Premix contributes 19,920 I.U. Vitamin A, 5,102 I.U. Vitamin $D^3$, 15 I.U. Vitamin E, 500 mg. zinc, 116 mg. magnesium, 48 mg. iron, 10 mg. copper, 20 mg. manganese, 44 mg. sulfur, 2.5 mg. cobalt and 1.5 mg. iodine per pound of supplement.

EXAMPLE 9

Test No. 3 is carried out for five days in this example.

In this example, there is attempted to determin whether cattle prefer the ration containing UAP plus limestone, even after they had become accustomed to receiving the control ration containing urea plus dicalcium phosphate.

The four Hereford steeds that had been used in the first test of Example 7 above are used for this test. Each animal which weighs approximately 800 pounds each is fed the control ad libitum exclusively for a five-day period. However, on the sixth day, the steers are offered a choice between the control and the test rations as described in Table III above.

The data obtained in Test No. 3 are shown in Table V. Even after the animals had received only the control ration for a five-day period, they show a marked preference for the ration containing UAP plus limestone over the control ration.

TABLE V.—ANIMAL PREFERENCE FOR RATION CONTAINING UAP AFTER CONSUMING ONLY CONTROL RATION FOR 5 DAY PERIOD

|  | Ration | Feed consumption (lb./day) | | | |
| --- | --- | --- | --- | --- | --- |
|  |  | Steer No. 5 | Steer No. 6 | Steer No. 7 | Steer No. 8 |
| Day: |  |  |  |  |  |
| 1st | Control | 17.0 | 19.5 | 19.0 | 20.0 |
| 2nd | do | 16.5 | 22.5 | 18.0 | 14.5 |
| 3rd | do | 22.0 | 19.0 | 13.5 | 21.5 |
| 4th | do | 22.5 | 25.0 | 22.9 | 25.0 |
| 5th | do | 18.5 | 23.5 | 15.5 | 21.5 |
| Avg |  | 19.3 | 21.9 | 17.8 | 20.5 |
| 6th | Control | 0.5 | 0.0 | 0.0 | 0.0 |
|  | UAP | 21.5 | 23.0 | 18.5 | 22.5 |

I claim:
1. A urea-ammonium phosphat feed supplement characterized by enhanced palatability to ruminant animals having: (a) an ammonia to phosphoric acid mole ratio from 1:1 to 1.4:1, respectively; (b) an ammonia nitrogen to urea nitrogen ratio not more than 2 to 8.75, respectively; and (c) a ratio of total nitrogen to phosphorus not less than about 3 and not more than about 10 to 1, respectively; wherein, the phosphoric acid has a P to F ratio greater than 100 to 1.

2. A composition according to claim 1 wherein the phosphoric acid is defluorinated wet-process acid.

3. A composition according to claim 1 wherein the ammonia to phosphoric acid ratio is about 1.3:1 and the total nitrogen to phosphorus ratio is about 4.5:1.

4. A ruminant composition containing carbohydrates and proteins and as an effective, supplementary source of nitrogen and phosphorus, a urea-ammonium phosphate composition of claim 1 having an ammonia to phosphoric acid ratio from 1:1 to 1.4:1, an ammonia nitrogen to urea nitrogen ratio not more than 2:8.75, and a ratio of total nitrogen to phosphorus of about 3:1.

5. A composition according to claim 4 wherein the phosphoric acid is defluorinated wet process phosphoric acid.

6. A method for enhancing the palatability of ruminant animal feeds according to claim 4 comprising: admixing with said feed an effective amount of a urea-ammonium phosphate according to claim 1 having an ammonia to phosphoric acid mole ratio from 1:1 to 1.4:1, respectively; an ammonia nitrogen to urea nitrogen ratio not more than 2 to 8.75; and a ratio of total nitrogen to phosphorus between about 3 and 10 to 1, respectively.

7. The method according to claim 6 wherein the phosphoric acid is wet process phosphoric acid.

References Cited
UNITED STATES PATENTS
2,814,556  11/1957  Christoffel _____ 71—29
3,420,672  1/1969  Appleman _____ 99—6

OTHER REFERENCES
Schaadt et al., J. Am. Sci., vol. 25, pp. 73–7, February 1, 1966.

Hockwitz, C. A., Food Additives, vol. 62, pp. 4516a, 1965.

LIONEL M. SHAPIRO, Primary Examiner